Aug. 19, 1924.

A. J. COLWELL

RECORDING GAUGE

Filed June 16, 1923

Inventor
Alvah J. Colwell.

Watson E. Coleman.
Attorney

Aug. 19, 1924.

A. J. COLWELL

RECORDING GAUGE

Filed June 16, 1923

Inventor
Alvah J. Colwell,
Watson E. Coleman
Attorney

Patented Aug. 19, 1924.

1,505,313

UNITED STATES PATENT OFFICE.

ALVAH J. COLWELL, OF NORFOLK, NEBRASKA.

RECORDING GAUGE.

Application filed June 16, 1923. Serial No. 645,775.

*To all whom it may concern:*

Be it known that I, ALVAH J. COLWELL, a citizen of the United States, residing at Norfolk, in the county of Madison and State of Nebraska, have invented certain new and useful Improvements in Recording Gauges, of which the following is a specification, reference being had to the accompanying drawings.

This invention relates to certain improvements in recording gauges and it is primarily an object of the invention to provide a novel and improved device of this general character adapted for use in connection with the crank pins or throws of a crank shaft to determine whether or not such pins or throws are parallel to the main bearings of the shaft.

Another object of the invention is to provide a novel and improved device of this general character which operates to give a graphic record of the conditions of the pins or throws of a crank shaft with respect to the main bearings of the shaft.

Furthermore, it is an object of the invention to provide a novel and improved device of this general character comprising an elongated member provided with marking means and which is adapted to be freely engaged with the pin or throw of a crank shaft to effect a reciprocation of the marking means upon a single rotation of the shaft, the line produced by the marking means indicating whether or not the pin or throw is parallel to the main bearings of the shaft.

The invention consists in the details of construction and in the combination and arrangement of the several parts of my improved recording gauge whereby certain important advantages are attained and the device rendered simpler, less expensive and otherwise more convenient and advantageous for use, as will be hereinafter more fully set forth.

The novel features of my invention will hereinafter be definitely claimed;

In order that my invention may be the better understood, I will now proceed to describe the same with reference to the accompanying drawings, wherein:—

Figure 1:
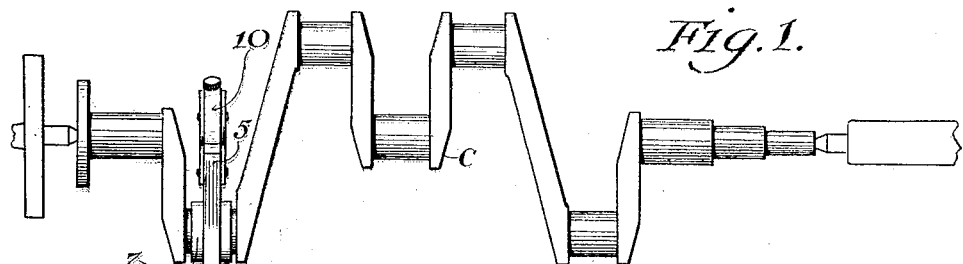
Figure 1 is a view in top plan illustrating a recording gauge constructed in accordance with an embodiment of my invention and in applied position.
Figure 2:
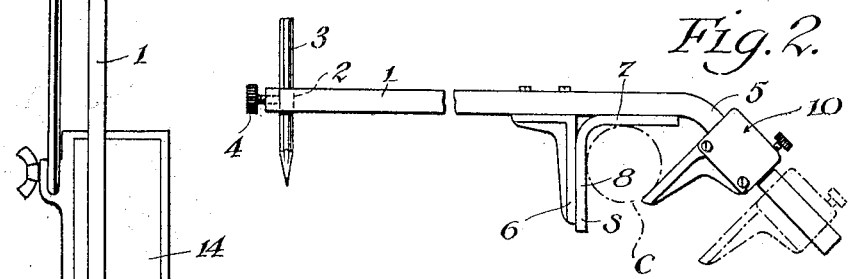
Figure 2 is a view in side elevation of my improved instrument as herein disclosed.
Figure 3:
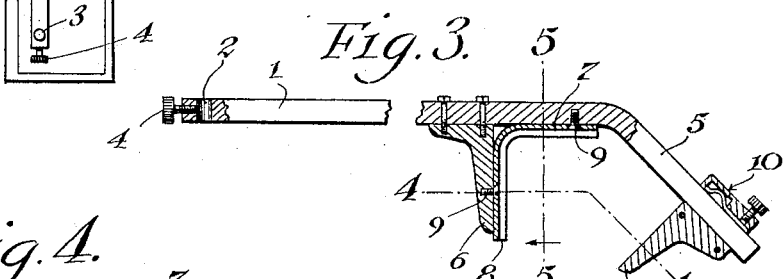
Figure 3 is a view partly in section and partly in side elevation of the instrument.
Figure 4:
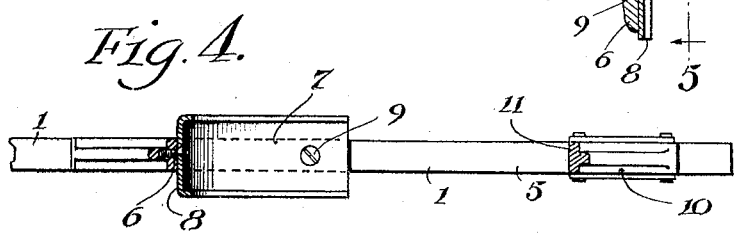
Figure 4 is a sectional view taken substantially on the line 4—4 of Figure 3.
Figure 5:
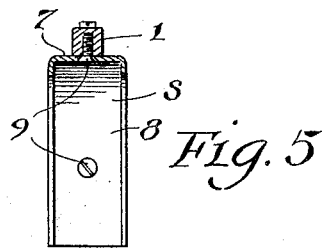
Figure 5 is a sectional view taken substantially on the line 5—5 of Figure 3.

As disclosed in the accompanying drawings, my improved gauge or instrument comprises an elongated bar or member 1 provided adjacent one end portion with an opening 2 through which is adapted to be inserted a pencil 3 or other marking implement, said pencil or implement being held in applied position through the instrumentality of the set screw 4 threaded through the adjacent end of the bar or member 1 for contact with said pencil or implement.

The opposite end portion of the bar or member 1 is continued by an extension 5 arranged at an angle of 45° with respect to the bar or member 1. The opening 2 and the extension 5 are disposed in the same general direction so that the marking end of the pencil or implement 3 and the extension 5 will be arranged at the same side of the member or bar 1.

Secured to the bar or member 1 at a predetermined distance inwardly of the extension 5 and extending in the same general direction as said extension is a bracket 6, the working face of which being perpendicular to the bar or member 1. Secured to the perpendicular face of the bracket 6 and the adjacent face of the bar or member 1 is a shoe S comprising two plates 7 and 8 at right angles one to the other, the central portion of one of said plates, as 7, being secured, by the screw 9 or the like, to the bar or member 1 while the second plate, as 8, is similarly secured to the bracket 6. The shoe S extends beyond opposite sides of the bar or member 1 and is of a width substantially equal to the length of the crank pin or throw to be gauged or tested.

Slidably mounted upon the extension 5 is a sleeve or head 10 from which extends a relatively narrow shoe 11, the working or inner face of said shoe being perpendicularly related to the extension 5. This shoe 11 extends in the same general direction as the bracket 6 and is substantially aligned therewith or with the longitudinal or central portion of the shoe S.

The sleeve or head 10 may be held in desired adjusted position lengthwise of the extension 5 as may be preferred but as herein disclosed I employ a set or binding screw 12 threaded through a wall of the sleeve or head 10 for requisite contact or engagement with the extension 5.

Figure 6:
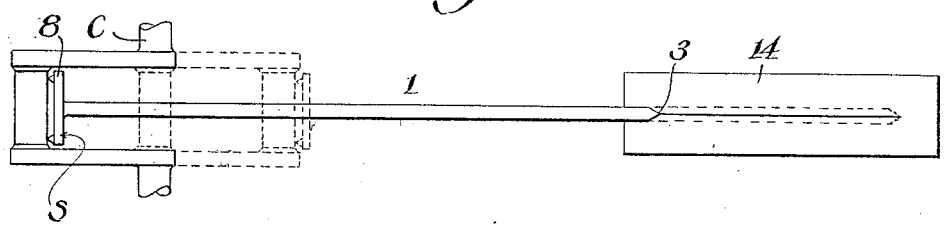
Figure 6 is a diagrammatic view illustrating my improved instrument recording a test of a crank pin or throw in proper parallel with the main bearing of the crank shaft.
Figure 7:
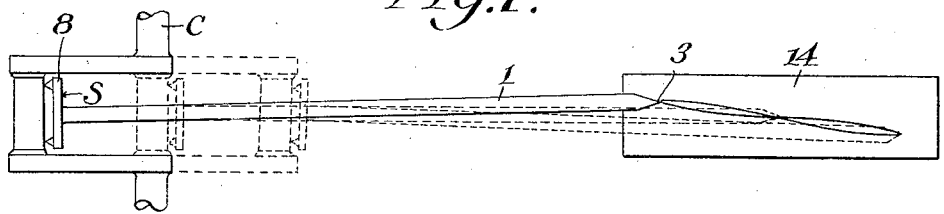
Figure 7 is a diagrammatic view illustrating my improved instrument making a graphic record of a crank pin or throw out of parallel on a horizontal position.

In practice a crank shaft is mounted between the centers of a lathe or otherwise as may be deemed expedient and the shoe S is engaged from above with the crank pin or throw to be tested. The sleeve or head 10 is then properly adjusted on the extension 5 to bring the shoe 11 into contact with the crank pin or throw whereby the device or instrument is properly held to the crank pin or throw yet permitting the desired rotation of the crank shaft C without lifting or raising the outer or opposite end of the member or bar 1 or that end portion carrying the pencil or marking implement 3. After the device or instrument has been properly engaged with the crank pin or throw a sheet 14 of paper or the like is suitably positioned with respect to the pencil or marking implement, with said crank pin or throw in its furthest position relative to said sheet. The crank shaft C is then revolved or turned one revolution with the pencil or marking implement 3 bearing on the sheet 14. If the crank pin or throw is parallel to the main bearing of the crank shaft the pencil or marking implement 3 will scribe a straight line on the sheet 14 as illustrated in Figure 6 but if there is any angular deviation of the crank pin or throw with respect to the axis of the main bearings, the pencil or marking implement 3 will scribe an arcuate or irregular line as in Figures 7, 8 and 9.

Figure 8:
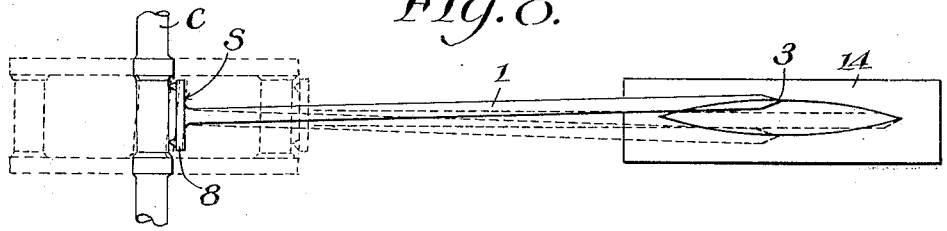
Figure 8 is a diagrammatic view showing a test of a pin out of parallel on a vertical position.

The marking of the pencil or implement 3 in Figure 8 indicates the crank pin or throw is out of parallel on the vertical position. The diagram produced in Figure 7 by the pencil or marking implement 3 not only records the angular deviation but indicates the side width of the piston rod during a scope of the motor.

Figure 9:
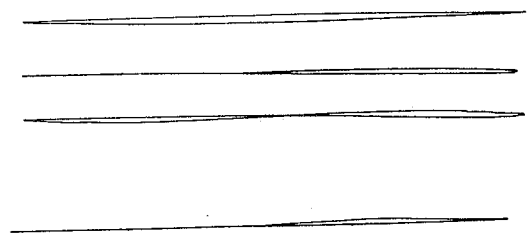
Figure 9 is a reproduction of the graphic record of a four-throw crank shaft produced with an instrument constructed in accordance with my invention.

Figure 9 is a reproduction of the graphic record obtained in gauging or testing a four-throw crank shaft.

In practice, I find it of advantage to have the distance from the working or contacting face of the plate 8 of the shoe S and the marking point of the pencil or implement 3 ten times greater than the width of said plate 8 and so that the diagrams produced by the instrument in a test will be ten times greater than the actual angular deviation of the crank pin or throw although it is to be understood that the extent of motion of the pencil or element 3 is not dependent upon the width of the plate 8.

It is to be understood that the diagrams produced by the instrument will vary in accordance with the actual condition of the crank pin or throw being tested or gauged but it has been fully established in actual practice that my improved instrument gives a graphic record of the condition of the pins or throws of a crank shaft and dispenses with the use of very costly and complicated machines now generally employed for the same purpose.

From the foregoing description it is thought to be obvious that a gauge constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An instrument for recording the angular deviation of the crank pin of a crank shaft relative to the axis of the main bearing of said shaft, comprising an elongated member, means carried by an end portion of said member to engage the member with the crank pin to be tested, and marking means carried by the opposite end portion of the member.

2. An instrument for recording the angular deviation of the crank pin of a crank shaft relative to the axis of the main bearing of said shaft, comprising an elongated member, marking means carried by one end portion of the member, the opposite end portion of the member being provided with an angular extension, and means carried by said extension for engagement with the crank pin to be tested, said extension being on an angle of 45° with respect to the member.

3. An instrument for recording the angular deviation of the crank pin of a crank shaft relative to the axis of the main bearing of said shaft, comprising an elongated member provided with marking means at one end, the opposite end portion of the member being provided with an angular extension, a shoe carried by the member at a point adjacent to the angular extension thereof, said shoe comprising perpendicularly related plates for contact with the crank pin to be tested, and a shoe carried by the angular extension of the member for contact with the pin to be tested.

4. An instrument for recording the angular deviation of the crank pin of a crank shaft relative to the axis of the main bearing of said shaft, comprising an elongated member provided with marking means at one end, the opposite end portion of the member being provided with an angular extension, a shoe carried by the member at a point adjacent to the angular extension thereof, said shoe comprising perpendicularly related plates for contact with the crank pin to be tested, a shoe carried by the angular extension of the member for contact with the pin to be tested, said last named shoe being movable lengthwise of the extension, and means for holding the shoe against movement.

5. An instrument for recording the angular deviation of the crank pin of a crank shaft relative to the axis of the main bearing of said shaft, comprising an elongated member, means carried by the member for freely connecting an end portion of the member with the crank pin to be tested, and marking means carried by the opposite end portion of the member, said member reciprocating upon a single revolution of the crank shaft.

In testimony whereof I hereunto affix my signature.

ALVAH J. COLWELL.